US010271333B2

(12) United States Patent
Cui et al.

(10) Patent No.: US 10,271,333 B2
(45) Date of Patent: Apr. 23, 2019

(54) SERVICE AWARE CARRIER AGGREGATION (71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Cheng P. Liu, Johns Creek, GA (US); Hongyan Lei, Plano, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 10 days.

(21) Appl. No.: 15/379,885

(22) Filed: Dec. 15, 2016

(65) Prior Publication Data

US 2018/0176966 A1 Jun. 21, 2018

(51) Int. Cl.
*H04W 72/04* (2009.01)
*H04W 76/25* (2018.01)
*H04W 76/15* (2018.01)
*H04L 5/00* (2006.01)
*H04W 8/20* (2009.01)
(Continued)

(52) U.S. Cl.
CPC ....... *H04W 72/0453* (2013.01); *H04L 5/0035* (2013.01); *H04L 47/827* (2013.01); *H04W 8/20* (2013.01); *H04W 76/15* (2018.02); *H04W 76/25* (2018.02); *H04W 88/08* (2013.01)

(58) Field of Classification Search
CPC ..... H04W 76/15; H04W 76/20; H04W 76/25; H04W 72/04; H04W 72/044; H04W 72/042; H04W 72/0453; H04W 72/0493; H04W 72/12; H04L 47/827; H04L 5/0035
See application file for complete search history.

(56) References Cited

U.S. PATENT DOCUMENTS 9,125,200 B2 9/2015 Choi et al.
9,288,823 B2 3/2016 Lei et al.
(Continued)

FOREIGN PATENT DOCUMENTS

WO WO 2013063885 5/2013

OTHER PUBLICATIONS

"LTE-Advanced Carrier Aggregation Optimization," Nokia Networks white paper, Nokia Solutions and Networks, 2015.
(Continued)

*Primary Examiner* — Ashley Shivers
(74) *Attorney, Agent, or Firm* — Hartman & Citrin LLC (57) ABSTRACT Concepts and technologies disclosed herein are directed to service aware carrier aggregation. According to one aspect disclosed herein, an eNodeB ("eNB") can learn, via a primary serving cell ("PSC"), that a user equipment ("UE") has a capability to utilize a carrier aggregation feature. The eNB can receive policy information and service information, and can learn, via the PSC, a service requested by the UE. The eNB can determine, based at least in part upon the policy information, the service information, and the service, whether to implement the carrier aggregation feature to provide the service to the UE. When the eNB determines that the carrier aggregation feature is to be implemented, the eNB can inform the UE to reconfigure a radio resource control ("RRC") configuration to include the PSC and a secondary serving cell ("SSC"). The eNB can allocate physical media resources for the service from the PSC and the SSC.

20 Claims, 8 Drawing Sheets (51) Int. Cl.
*H04L 12/911* (2013.01)
*H04W 88/08* (2009.01)

(56) References Cited

U.S. PATENT DOCUMENTS

| | | |
|---|---|---|
| 9,332,479 B2 | 5/2016 | Dinan |
| 2013/0343324 A1 | 12/2013 | Lin et al. |
| 2014/0169343 A1 | 6/2014 | Skov et al. |
| 2014/0328316 A1 | 11/2014 | Chmiel et al. |
| 2015/0098379 A1 | 4/2015 | Lunden et al. |
| 2015/0341148 A1 | 11/2015 | Kazmi et al. |
| 2016/0029233 A1 | 1/2016 | Kollar et al. |
| 2016/0044548 A1 | 2/2016 | Choi et al. |
| 2016/0044655 A1 | 2/2016 | Park et al. |
| 2016/0073370 A1 | 3/2016 | Axmon et al. |

OTHER PUBLICATIONS

Vidhya et al., "Dynamic Carrier Aggregation in 5G network scenario," 2015 International Conference on Computing and Network Communications (CoCoNet '15), Dec. 16-19, 2015, IEEE.

SERVICE AWARE CARRIER AGGREGATION

BACKGROUND

Carrier aggregation is a Third Generation Partnership Project ("3GPP") feature defined for the Long Term Evolution Advanced ("LTE-A") standard. Carrier aggregation allows data to be simultaneously transmitted via multiple carriers to a single user equipment ("UE"). The UE connects to a primary serving cell and one or more secondary serving cells. The primary serving cell is where the UE establishes the radio resource control ("RRC") connection and where the physical uplink control channel ("PUCCH") is used. The secondary serving cells can be monitored by the UE for downlink assignment and/or to transmit uplink data. The UE typically establishes an RRC connection only to the primary serving cell and will only transmit PUCCH (i.e., uplink control information) to the primary serving cell. The secondary serving cell(s), on the other hand, can be used to transmit downlink control information and data over the physical downlink control channel ("PDCCH") and the physical downlink shared channel ("PDSCH") and can receive uplink data via the physical uplink shared channel ("PUSCH").

Carrier aggregation provides several benefits. Some benefits provided by carrier aggregation include increased downlink speed across the coverage area, more efficient use of radio spectrum, higher capacity, and increased throughput on the uplink. The current iteration of carrier aggregation does not offer flexible and granular carrier aggregation control. For example, if a voice-over-LTE ("VoLTE") application is running on a UE, carrier aggregation is deactivated for all communications by the UE, regardless of whether other services may benefit from carrier aggregation on the UE.

SUMMARY

Concepts and technologies disclosed herein are directed to service aware carrier aggregation. According to one aspect disclosed herein, an eNodeB ("eNB") can learn, via a primary serving cell ("PSC"), that a user equipment ("UE") has a capability to utilize a carrier aggregation feature. The eNB can receive policy information and service information, and can learn, via the PSC, a service requested by the UE. The eNB can determine, based at least in part upon the policy information, the service information, and the service, whether to implement the carrier aggregation feature to provide the service to the UE. When the eNB determines that the carrier aggregation feature is to be implemented, the eNB can inform the UE to reconfigure a radio resource control ("RRC") configuration to include the PSC and a secondary serving cell ("SSC"). In some embodiments, the eNB can inform the UE to reconfigure the RRC configuration to include one or more additional SSCs. The eNB can allocate physical media resources for the service from the PSC and the SSC(s).

In some embodiments, the policy information can include a rule that specifies a condition under which the user equipment should utilize the carrier aggregation feature on a service-specific basis. The service information, in some embodiments, can include a plurality of services available to the UE.

In some embodiments, the eNB can determine that the carrier aggregation feature is not to be implemented. In these embodiments, the eNB can maintain the RRC configuration as including only the PSC without any changes, such as adding one or more SSCs.

In some embodiments, the eNB can allocate physical media resources based upon a bandwidth requirement of the service. In some embodiments, the eNB can allocate physical media resources based upon a radio link control ("RLC") buffer status. In some embodiment, the eNB can allocate physical media resources based upon a bandwidth requirement of the service and an RLC buffer status.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to service aware carrier aggregation. More particularly, service aware carrier aggregation scheduling can allow a UE to take advantage of carrier aggregation features on a per service level instead of on a per UE basis. For example, if a UE supports both voice and data communications, carrier aggregation can be deactivated for voice services while data services can still benefit from carrier aggregation.

Service aware scheduling enables carrier aggregation and decides which service(s) to only use a primary serving cell, and which service(s) to use both a primary serving cell and a secondary serving cell. In this manner, the concepts and technologies disclosed herein provide more granularity and flexibility over the solutions currently available and defined in 3GPP standards.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for service aware carrier aggregation will be described.

Figure 1:
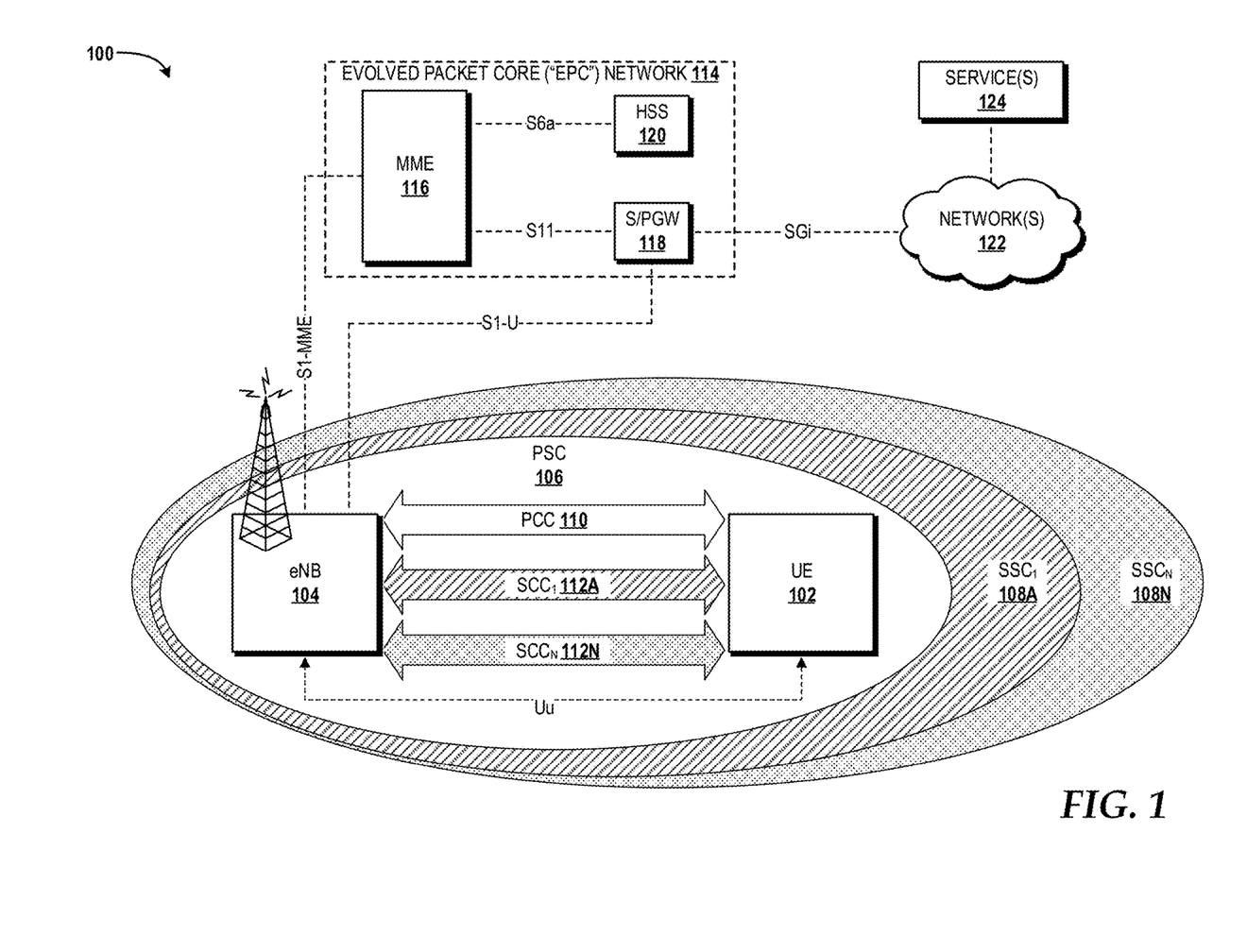
FIG. 1 is a block diagram illustrating aspects of an illustrative operating environment in which the concept and technologies disclosed herein can be implemented.

Referring now to FIG. 1, an illustrative operating environment 100 in which the concepts and technologies disclosed herein can be implemented will be described. The operating environment 100 includes a user equipment device ("UE") 102 operating in communication with an eNodeB ("eNB") 104 operating as part of a radio access network ("RAN") (not shown). The UE 102 can be a cellular phone, a feature phone, a smartphone, a mobile computing device, a tablet computing device, a portable television, a portable video game console, or the like capable of communicating with the eNB 104 using LTE protocols. The UE 102 and the eNB 104 are configured to operate in accordance with 3GPP standards for LTE-A to take advantage of existing carrier aggregation features and the enhanced carrier aggregation feature disclosed herein for service awareness.

Carrier aggregation allows data to be simultaneously transmitted via multiple carriers to a single UE. In the illustrated example, the eNB 104 provides a primary serving cell (referred to herein as "PSC") 106 and one or more secondary cells (referred to herein as "SSCs") 108A-108N. A primary component carrier ("PCC") 110 corresponds to the PSC 106. Secondary component carriers ("SCCs") 112A-112N correspond, respectively, to the SSCs 108A-108N. The UE 102 and the eNB 104 establish a radio resource control ("RRC") connection over an air/Uu interface via the PCC 110. The PCC 110 also can facilitate the exchange of user data between the UE 102 and the eNB 104. The SCCs 112A-112N also facilitate the exchange of user data between the UE 102 and the eNB 104. Although one PCC and two SCCs are illustrated as being provided by one eNB, those skilled in the art will appreciate implementations of the concepts and technologies disclosed herein that utilize multiple eNBs, each providing a PCC and one or more SCCs. As such, the illustrated embodiment should not be construed as being limiting in any way.

The UE 102 connects to the PSC 106 via the PCC 110 to establish the RRC connection and to establish a PUCCH. The UE 102 also connects to the SSCs 108A-108N via the SCCs 112A-112N. The SSCs 108A-108N can be monitored by the UE 102 for downlink assignment and/or to transmit uplink data. The SSCs 108A-108N can be used to transmit downlink control information and data over the PDCCH and the PDSCH and can receive uplink data via the PUSCH.

The eNB 104 can operate in a RAN embodied as an Evolved Universal Terrestrial Radio Access Network ("E-UTRAN") (not shown). The E-UTRAN can include multiple eNBs 104. The E-UTRAN provides E-UTRAN user plane functionality via packet data convergence protocol ("PDCP"), radio link control ("RLC"), media access control ("MAC"), and the physical layer. The E-UTRAN also provides control plane functionality via RRC protocol terminations towards the UE 102. Although not shown in the illustrated example, the eNB 104 can be connected to one or more other eNBs via one or more X2 interfaces (also not shown).

The eNB 104 is a base station and can be in communication with one or more antennas (not shown), each of which may be configured in accordance with any antenna design specifications to provide a physical interface for receiving and transmitting radio waves to and from one or more devices, such as the UE 102. In particular, the eNB 104 provides the air/Uu interface over which the UE 102 can connect to an evolved packet core ("EPC") network 114. The eNB 104 connects to the EPC network 114 via an S1 interface, and more specifically to a mobility management entity ("MME") 116 via an S1-MME and to a serving gateway of a combined serving and packet gateway ("S/PGW") 118 via an S1-U interface.

The EPC network 114 can include one or more MMES 116, one or more combined S/PGWs 118, and one or more home subscriber servers ("HSS") 120. Although not shown in the illustrated example, the EPC network 114 can additionally include other network elements not shown in the illustrated embodiment.

The core network components of the EPC network 114 can be implemented as physical network functions ("PNFs") having hardware and software components. The core network components of the EPC network 114 can additionally or alternatively be provided, at least in part, by virtual network functions ("VNFs"). For example, the core network components can be realized as VNFs that utilize a unified commercial-of-the-shelf ("COTS") hardware and flexible resources shared model with the application software for the respective core network components running on one or more virtual machines ("VMs"). Moreover, the core network components can be embodied as VNFs in one or more VNF pools, each of which can include a plurality of VNFs providing a particular core network function. For example, the MME 116, the S/PGW 118, the HSS 120, or any combination thereof can be implemented as standalone VNFs or as a VNF operating in a VNF pool.

The MME 116 can be configured in accordance with 3GPP standards specifications. The MME 116, in general, can perform operations to control signaling traffic related to mobility and security for access to the eNB 104 via the S1-MME interface. The MME 116 is also illustrated as being in communication with the HSS 120 via an S6a interface and the S/PGW 118 via an S11 interface. These interfaces are defined as part of 3GPP standards specifications.

The SGW and the PGW of the combined S/PGW 118 can be configured in accordance with 3GPP standards specifications. The SGW provides a point of interconnect between the radio-side (e.g., the eNB 104) and the EPC network 114. The SGW can serve devices by routing incoming and outgoing IP packets between the eNB 104 and the EPC network 114. The PGW interconnects the EPC network 114 to one or more other networks, such as one or more other public land mobile networks ("PLMNs"), one or more packet data networks ("PDNs") (e.g., the Internet), combinations thereof, and/or the like—generally shown as network(s) 122. The PGW routes IP packets to and from the network(s) 122. The PGW also perform operations such as IP address/prefix allocation, policy control, and charging. The S/PGW 118 is illustrated as being in communication with the MME 116 via an S11 interface and the network(s) 122 via a SGi interface. These interfaces are defined as part of 3GPP standards specifications.

The HSS 120 can be configured in accordance with 3GPP standards specifications. The HSS 120 is a database that contains user-related information for users of devices, such as the UE 102. The HSS 120 can provide support functions to the MME 116 for mobility management, call and data session setup, user authentication, and access authorization.

The network(s) 122 are in communication one or more services 124. The services 124 broadly encompass any services accessible by the UE 102 via the eNB 104 and the EPC network 114. The services 124 can be provided, at least in part, via one or more application servers (not shown). Some examples of the services 124 include, but are not limited to, email services, calendar services, contact management services, collaboration services, instant messaging services, chat services, forum services, other communication services, social networking services, other application-specific services, and/or the like.

It should be understood that some implementations of the operating environment 100 include multiple UEs 102, multiple eNBs 104, multiple PSCs 106, multiple PCCs 110, multiple EPCs 114, multiple MMES 116, multiple HSSs 120, multiple S/PGWs 118, or some combination thereof. Thus, the illustrated embodiment should be understood as being illustrative, and should not be construed as being limiting in any way.

Figure 2:
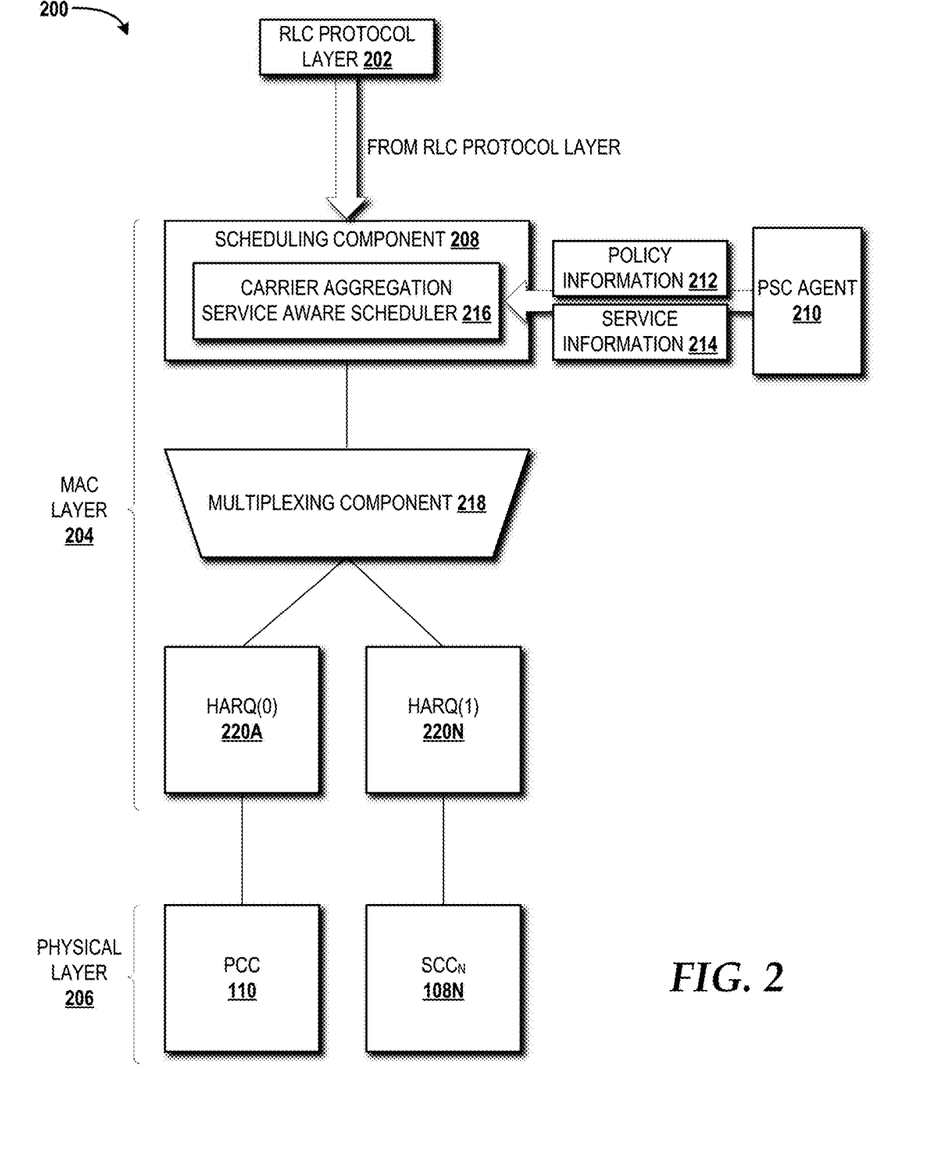
FIG. 2 is a block diagram illustrating an LTE protocol stack for a radio interface configured to facilitate service aware carrier aggregation in accordance with the concepts and technologies disclosed herein, according to an illustrative embodiment.

Referring now to FIG. 2, a block diagram illustrating an LTE protocol stack 200 for a radio interface configured to facilitate service aware carrier aggregation in accordance with the concepts and technologies disclosed herein will be described, according to an illustrative embodiment. The LTE protocol stack 200 will be described with reference to FIG. 2 and additional reference to FIG. 1.

The illustrated LTE protocol stack 200 includes an RLC protocol layer 202, a MAC layer 204, and a physical layer 206. These layers exist in the UE 102 and the eNB 104 on the Uu interface. Functionality of the RLC protocol layer 202, the MAC layer 204, and the physical layer 206 can be provided in accordance with specifications provided by 3GPP. Since these protocol layers are well-known, additional details describing the basic functionality thereof will not be described herein.

The illustrated RLC protocol layer 202 feeds into the MAC layer 204. The illustrated MAC layer 204 includes a scheduling component 208. In accordance with existing carrier aggregation techniques, the scheduling component 208 can schedule resources to be allocated to the UE 102 on the same carrier (e.g., the PCC 110) or on multiple carriers (e.g., the PCC 110 and one or more of the SCCs 112). The concepts and technologies disclosed herein improve upon this functionality by utilizing a PSC agent 210 to provide policy information 212 and service information 214 to the scheduling component 208. The policy information 212 can include one or more rules that each specifies one or more conditions under which the UE 102 should utilize carrier aggregation on a service-specific basis. The service information 214 can specify the services available to the UE 102. Based upon the policy information 212 and the service information 214, a carrier aggregation service aware scheduler 216 can determine for which service(s) provided to the UE 102 to only use the PSC 106 and for which service(s) provided to the UE 102 to use both the PSC 106 and one or more of the SSCs 108. When the carrier aggregation service aware scheduler 216 determines, based at least in part upon the policy information 212 and the service information 214, that carrier aggregation is to be implemented for the UE 102 for a given service, the UE 102 is informed to establish a $2^{nd}$ RRC link with one or more of the SSCs 108.

The scheduling component 208 feeds into a multiplexing component 218. The multiplexing component 218 performs multiplexing/demultiplexing of packet data units received from the RLC protocol layer 202 into/from transport blocks delivered to/from the physical layer 206 on transport channels. The MAC layer 204 also provides error correction functionality through hybrid automatic repeat request ("HARQ")—shown as HARQ(0) 220A and HARQ(1) 220N corresponding to each component carrier for a given carrier aggregation implementation—to control the uplink and downlink physical layer retransmission handling in the eNB 104 via the PCC 110 and one or more of the SCCs 108. The basic functionality of HARQ does not change with the concepts and technologies disclosed herein. As such, additional details regarding HARQ are not described herein.

Figure 3:
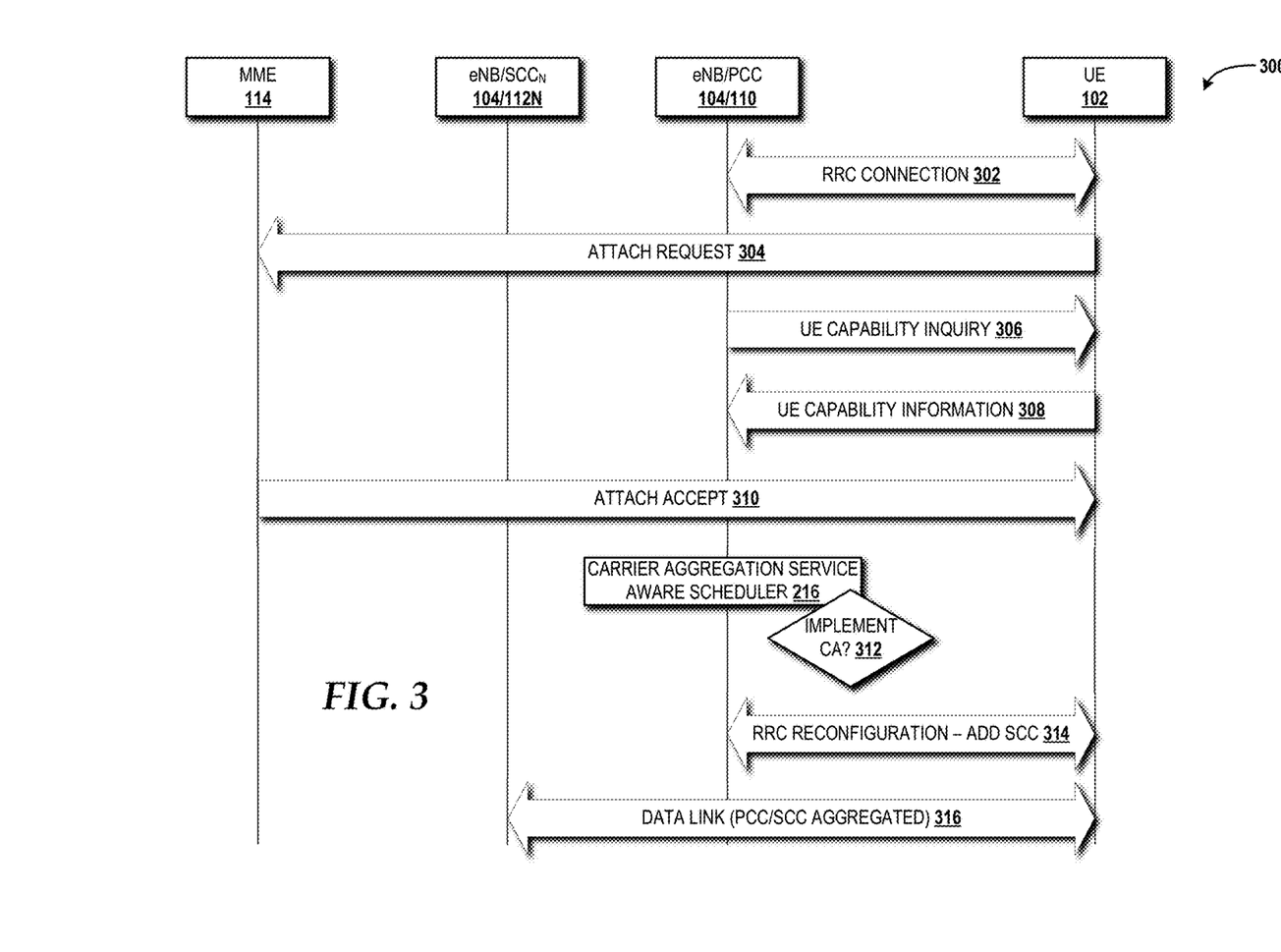
FIG. 3 is a ladder diagram illustrating messages exchanged among network elements during service aware carrier aggregation in accordance with the concepts and technologies disclosed herein, according to an illustrative embodiment.

Turning now to FIG. 3, a ladder diagram 300 illustrating messages exchanged among network elements during service aware carrier aggregation in accordance with the concepts and technologies disclosed herein will be described, according to an illustrative embodiment. The messages exchanged in the ladder diagram 300 are consistent with those exchanged during traditional carrier aggregation with the exception of a decision handled by the carrier aggregation service aware scheduler 216 regarding whether or not to implement carrier aggregation for a given service. The ladder diagram 300 will be described with reference to FIG. 3 and additional reference to FIGS. 1 and 2.

The illustrated ladder diagram 300 includes the MME 114, the eNB 104/SCC$_N$ 112N, the eNB 104/PCC 110, and the UE 102. The UE 102 establishes an RRC connection 302 with the eNB 104. After the UE 102 establishes the RRC connection 302 with the eNB 104, the UE 102 then generates an attach request 304 and sends the attach request 304 to the MME 114. The eNB 104 generates and sends a UE capability inquiry 306 to the UE 102. The UE capability inquiry 306 can, among other things, be used by the eNB 104 to determine whether or not the UE 102 is capable of carrier aggregation. The assumption moving forward is that the UE 102 is capable of carrier aggregation. The UE 102 accordingly replies to the eNB 104 with the UE capability information 308 indicating that the UE 102 is capable of carrier aggregation. Following this exchange the MME 114 can generate and send an attach accept message 310 to the UE 102, thereby completing the attachment process. The UE 102 can then communicate with the eNB 104 over the PCC 110.

The carrier aggregation service aware scheduler 216 can then utilize the policy information 212 and the service information 214 to determine whether carrier aggregation should be implemented (generally shown at 312) for a given service requested by the UE 102. This decision 312 can be made each time a service is requested by the UE 102. In the illustrated example, the assumption is that the carrier aggregation service aware scheduler 216 has determined that carrier aggregation is to be implemented for a requested service.

After determining that carrier aggregation is to be implemented for a requested service, the eNB 104 can request a reconfiguration of the RRC connection 302—shown as RRC reconfiguration 314—to add one or more SCCs 112, such as the $SCC_N$ 112N in the illustrated example. After the RRC reconfiguration 314, the UE 102 can communicate with the eNB 104 via an aggregated data link 316 over the PCC 110 and the SCC 112. For each new service requested by the UE 102, the carrier aggregation service aware scheduler 216 can repeat this process.

Figure 4:
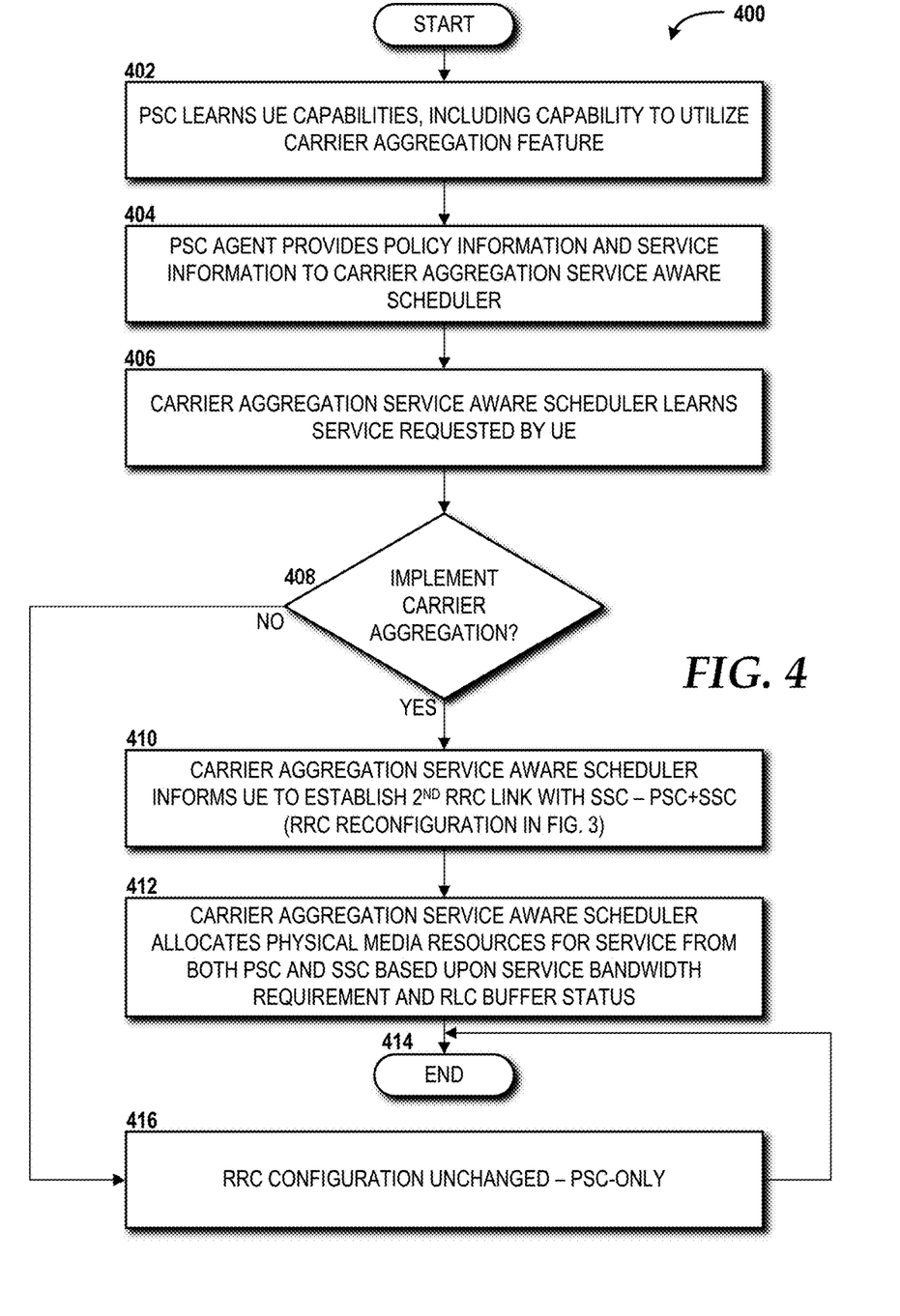
FIG. 4 is a flow diagram illustrating aspects of a method for service aware carrier aggregation, according to an illustrative embodiment.

Turning now to FIG. 4, aspects of a method 400 method for service aware carrier aggregation will be described, according to an illustrative embodiment. The method 400 will be described with reference to FIG. 4 and further reference to FIGS. 1-3. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, operations of the method 400 are described as being performed, at least in part, by the eNB 104 via execution, by one or more processors, of one or more software modules, including, for example, the carrier aggregation service aware scheduler 216. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins and proceeds to operation 402, where the PSC 106 provided by the eNB 104 learns the capabilities of the UE 102, including a capability of the UE 102 to utilize a carrier aggregation feature. From operation 402, the method 400 proceeds to operation 404, where the PSC agent 210 of the eNB 104 provides the policy information 212 and the service information 214 to the carrier aggregation service aware scheduler 216. From operation 404, the method 400 proceeds to operation 406, where the carrier aggregation service aware scheduler 216 learns of the active service requested by the UE 102.

From operation 406, the method 400 proceeds to operation 408, where the carrier aggregation service aware scheduler 216 determines, based upon the active service requested by the UE 102, the policy information 212, and the service information 214, whether to implement carrier aggregation for the UE 102. If the carrier aggregation service aware scheduler 216 determines that carrier aggregation is to be implemented for the UE 102, the method 400 proceeds to operation 410, where the carrier aggregation service aware scheduler 216 informs the UE 102 to establish a $2^{nd}$ RRC link with the eNB 104 for the SSC 108. Operation 410 is shown as the RRC reconfiguration 314 in FIG. 3. This forms the aggregated carrier that includes the PCC 110 and the SCC 112. The aggregated carrier can alternatively include more than one SCC 112 depending upon the service requested by the UE 102 and in accordance with the policy information 212.

From operation 410, the method 400 proceeds to operation 412, where the carrier aggregation service aware scheduler 216 allocates the physical media resources for the service from both the PSC 106 and the SSC 108 based upon the bandwidth requirement of the service and the RLC buffer status. From operation 412, the method 400 proceeds to operation 414, where the method 400 ends.

Returning to operation 408, if the carrier aggregation service aware scheduler 216 determines that carrier aggregation is not to be implemented for the UE 102, the method 400 proceeds to operation 416. At operation 416, the RRC configuration is unchanged. In other words, the PSC 106 remains the only serving cell for the UE 102. The method 400 then proceeds to operation 414, where the method 400 ends.

Figure 5:
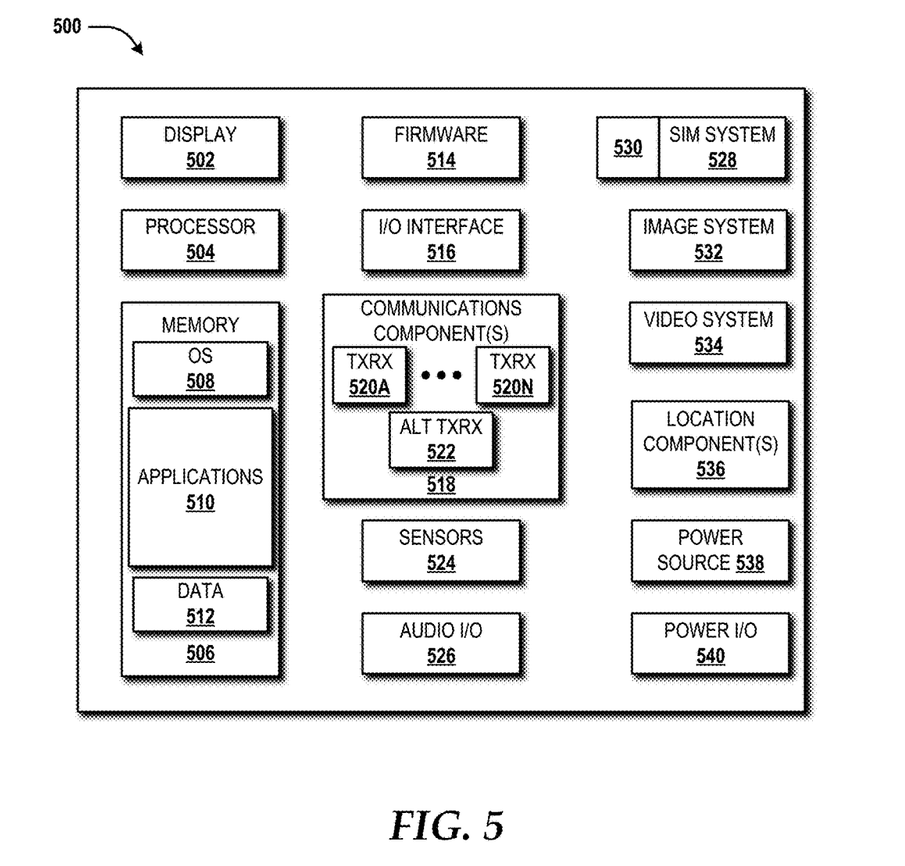
FIG. 5 is a block diagram illustrating an example mobile device capable of implementing aspects of the embodiments presented herein.

Turning now to FIG. 5, an illustrative mobile device 500 and components thereof will be described. In some embodiments, the UE 102 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, one or more identifiers, and/or other applications or program modules. According to various embodiments, the data 512 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/ WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/ or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
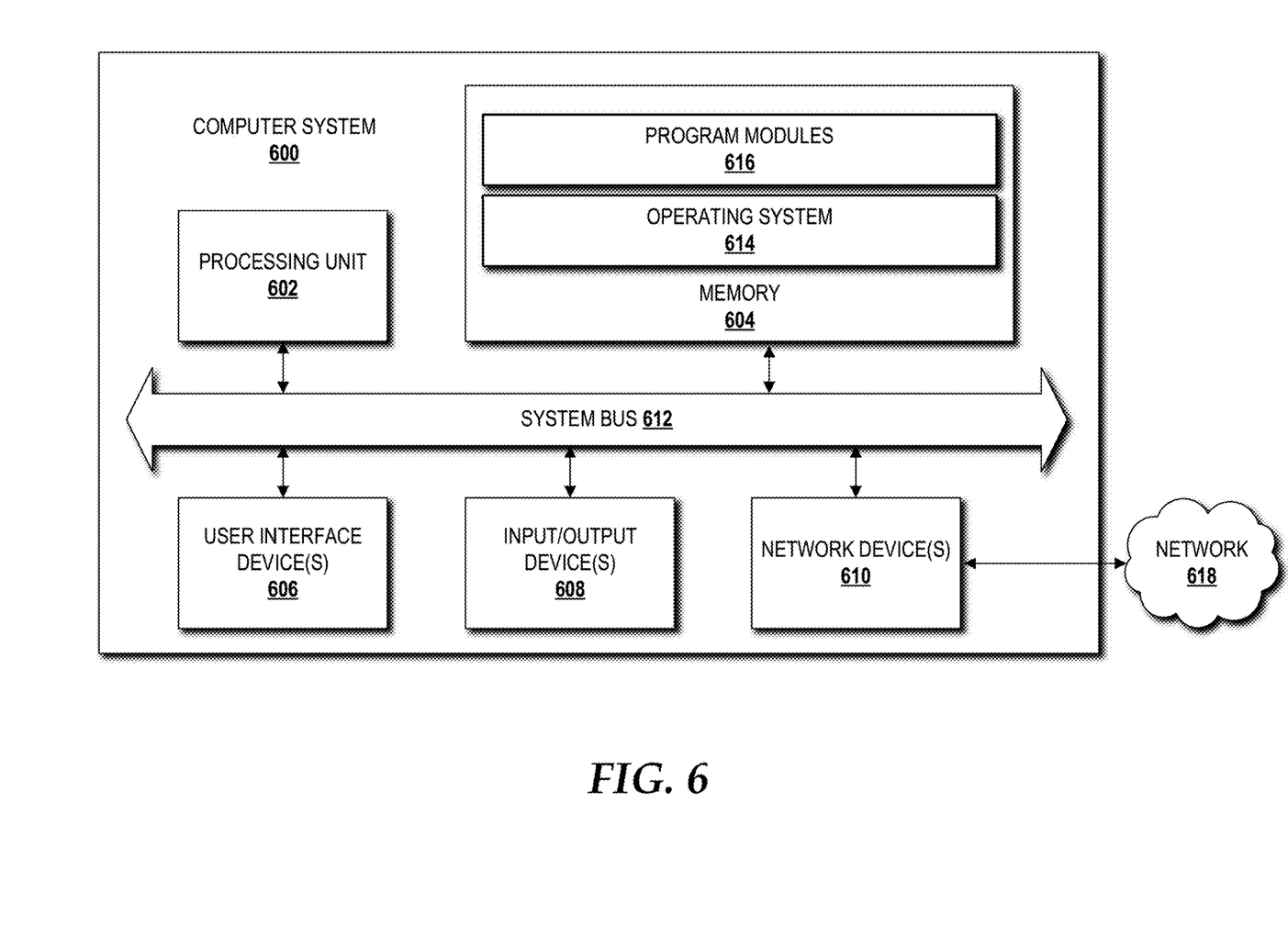
FIG. 6 is a block diagram illustrating an example computer system capable of implementing aspects of the embodiments presented herein.

Turning now to FIG. 6 is a block diagram illustrating a computer system 600 configured to provide the functionality in accordance with various embodiments of the concepts and technologies disclosed herein. The systems, devices, and other components disclosed herein can utilize, at least in part, an architecture that is the same as or at least similar to the architecture of the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618, such as the network(s) 112. Examples of the network devices 610 include, but are not limited to, a modem, a radio frequency ("RF") or infrared ("IR") transceiver, a telephonic interface, a bridge, a router, or a network card. The network 618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be or may include a wired network such as, but not limited to, a Wide Area Network ("WAN"), a wired Personal Area Network ("PAN"), or a wired Metropolitan Area Network ("MAN").

Figure 7:
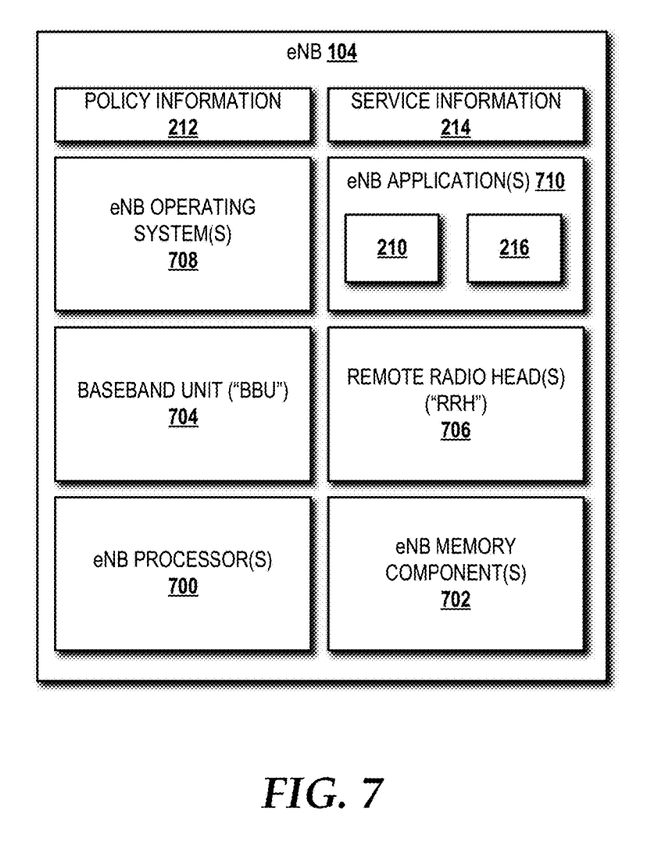
FIG. 7 is a block diagram illustrating aspects of an illustrative eNodeB capable of implementing aspects of the embodiments presented herein.

Turning now to FIG. 7, a block diagram illustrating aspects of the eNB 104 that is capable of implementing aspects of the embodiments presented herein will be described. The eNB 104 illustrated in FIG. 7 includes one or more eNB processors 700, one or more eNB memory components 702, a baseband unit ("BBU") 704, one or more remote radio heads ("RRHs") 706, one or more eNB operating systems 708, one or more eNB applications 710, the policy information 212, and the service information 214. Each of these components will now be described in detail.

An eNB processor 700 can include one or more processing units configured to process data, execute computer-executable instructions of one or more application programs, and communicate with other components of the eNB 104 in order to perform various functionality described herein. The eNB processor 700 may be utilized to execute aspects of the eNB operating system(s) 708 and the eNB application(s) 710. In some embodiments, the eNB processor 700 is or includes a CPU, a communications processor, or a field-programmable gate array ("FPGA"). In some embodiments, the eNB processor 700 is, or is included in, a SoC along with one or more of the other components described herein below. For example, the SoC may include the eNB processor 700, a GPU, the BBU 704, the RRH 706, or some combination thereof. In some embodiments, the eNB processor 700 is fabricated, in part, utilizing a PoP integrated circuit packaging technique. Moreover, the eNB processor 700 may be a single core or multi-core processor. The eNB processor 700 may be created in accordance with an ARM architecture, available for license from ARM HOLDINGS of Cambridge, United Kingdom. Alternatively, the eNB processor 700 may be created in accordance with an x86 architecture, such as is available from INTEL CORPORATION of Mountain View, Calif. and others. In some embodiments, the eNB processor 700 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an OMAP SoC, available from TEXAS INSTRU- MENTS of Dallas, Tex., a customized version of any of the above SoCs, or a proprietary SoC.

The eNB memory components 702 can include a RAM, a ROM, an integrated storage memory, and a removable storage memory, or some combination thereof. In some embodiments, the eNB memory components 702 store the eNB operating system(s) 708 or a portion thereof (e.g., operating system kernel or bootloader), the eNB application(s) 710, the policy information 212, and the service information 214.

The BBU 704 is the baseband processing unit of the eNB 104. The BBU 704 can include other components shown, including, for example, the eNB processor(s) 200, the eNB memory component(s) 704, the eNB operating system(s) 708, the eNB application(s) 710, or some combination thereof. The BBU 704 can receive IP packets received from the EPC network 112 (see FIG. 1) and can modulate the IP packets into digital baseband signals. The BBU 704 can send the digital baseband signals to the RRH(s) 706. The digital baseband signals received from the RRH(s) 706 are demodulated and IP packets are transmitted to the EPC network 112. The RRH(s) 706 can transmit and receive wireless signals to/from the UE 102. The RRH(s) 706 also convert the digital baseband signals from the BBU 704 that have been subjected to protocol-specific processing into RF signals and power amplifies the signals for transmission to the UE 102. The RF signals received from the UE 102 are amplified and converted to digital baseband signals for transmission to the BBU 704.

The eNB operating system 708 is a program for controlling the operation of the eNB 104. The eNB operating system 708 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

An eNB application 710 can be any application that performs operations for the eNB 104. For example, the eNB application(s) 710 can be or can include software compliant with 3GPP standards for call control processing, performance management, self-organizing network functions, and the like. In context of the concepts and technologies disclosed herein, the eNB applications 710 can particularly include the PSC agent 210 and the carrier aggregation service aware scheduler 216.

Figure 8:
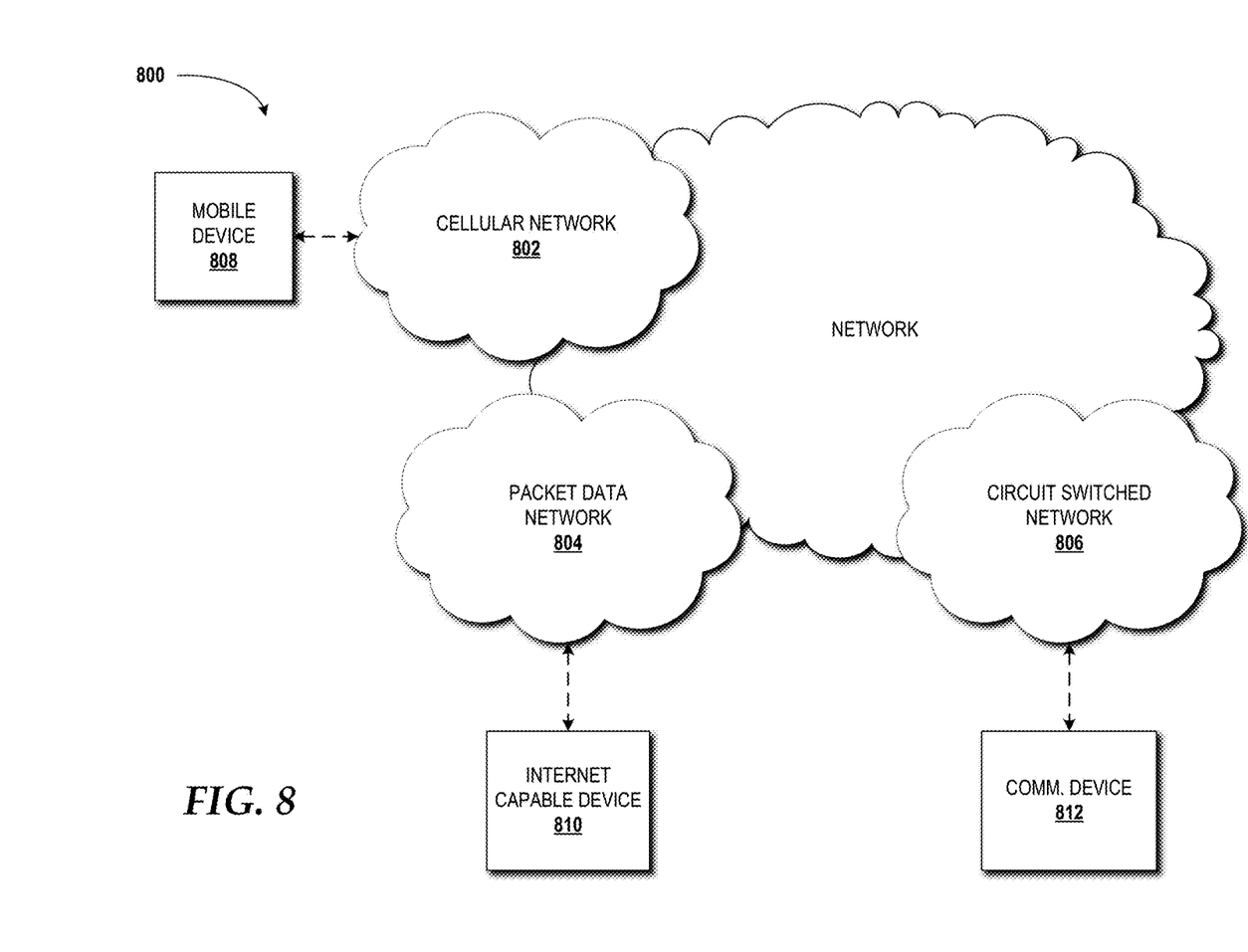
FIG. 8 is a diagram illustrating a network, according to an illustrative embodiment.

Turning now to FIG. 8, details of a network 800 are illustrated, according to an illustrative embodiment. In some embodiments, the network 800 includes the EPC network 112, the network(s) 114, or the operating environment 100. The network 800 includes a cellular network 802, a packet data network 804, for example, the Internet, and a circuit switched network 806, for example, a public switched telephone network ("PSTN"). The cellular network 802 includes various components such as, but not limited to, base transceiver stations ("BTSs"), NBs or eNBs, base station controllers ("BSCs"), radio network controllers ("RNCs"), mobile switching centers ("MSCs"), MMES, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the UE device 102, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network is used to refer broadly to any combination of the networks 802, 804, 806 shown in FIG. 8, the EPC network 112, the network(s) 112, or the entirety of the operating environment 100. It should be appreciated that substantially all of the functionality described with reference to the network(s) 114 can be performed by the cellular network 802, the packet data network 804, and/or the circuit switched network 806, alone or in combination with other networks, network elements, and the like.

Based on the foregoing, it should be appreciated that concepts and technologies directed to service aware carrier aggregation have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. An eNodeB that provides a primary serving cell and a secondary serving cell, the eNodeB comprising:
   a carrier aggregation service aware scheduler;
   a primary serving cell agent;
   a processor; and
   a memory component storing instructions that, when executed by the processor cause the processor to perform operations comprising
      establishing, with a user equipment, a radio resource control connection via a primary component carrier corresponding to the primary serving cell,
      generating and sending a capability inquiry to the user equipment,
      in response to the capability inquiry, receiving, by the primary serving cell agent, from the user equipment, capability information indicating that the user equipment is capable of implementing a carrier aggregation feature,
      receiving, by the carrier aggregation service aware scheduler, policy information from the primary serving cell agent,
      receiving, by the carrier aggregation service aware scheduler, service information from the primary serving cell agent,
      learning, by the carrier aggregation service aware scheduler, a service requested by the user equipment,
      determining, based at least in part upon the policy information, the service information, and the service requested by the user equipment, whether to implement the carrier aggregation feature to provide the service to the user equipment,
      when the eNodeB determines that the carrier aggregation feature is to be implemented, requesting, by the carrier aggregation service aware scheduler, the user equipment to reconfigure the radio resource control connection to add a secondary component carrier corresponding to the secondary serving cell, and
      allocating, by the carrier aggregation service aware scheduler, physical media resources for the service from both the primary serving cell and the secondary serving cell.

2. The eNodeB of claim 1, wherein the policy information comprises a rule that specifies a condition under which the user equipment should utilize the carrier aggregation feature on a service-specific basis.

3. The eNodeB of claim 1, wherein the service information specifies a plurality of services available to the user equipment.

4. The eNodeB of claim 1, wherein the operations further comprise, when the eNodeB determines that the carrier aggregation feature is not to be implemented, maintaining the radio resource control connection.

5. The eNodeB of claim 1, wherein allocating physical media resources for the service from both the primary serving cell and the secondary serving cell is based upon a bandwidth requirement of the service.

6. The eNodeB of claim 5, wherein allocating physical media resources for the service from both the primary serving cell and the secondary serving cell is further based upon radio link control buffer status.

7. The eNodeB of claim 1, wherein requesting, by the carrier aggregation service aware scheduler, the user equipment to reconfigure the radio resource control connection comprises requesting, by the carrier aggregation service aware scheduler, the user equipment to reconfigure the radio resource control connection to add a further secondary serving cell.

8. A method comprising:
   establishing, by an eNodeB that provides a primary serving cell and a secondary serving cell, with a user equipment, a radio resource control connection via a primary component carrier corresponding to the primary serving cell;
   generating and sending, by the eNodeB, a capability inquiry to the user equipment;
   in response to the capability inquiry, receiving, by a primary serving cell agent, from the user equipment, by the eNodeB, capability information indicating that the user equipment is capable of implementing a carrier aggregation feature;
   receiving, by a carrier aggregation service aware scheduler of the eNodeB, policy information from the primary serving cell agent;
   receiving, by the carrier aggregation service aware scheduler of the eNodeB, service information from the primary serving cell agent;
   learning, by the carrier aggregation service aware scheduler of the eNodeB, a service requested by the user equipment;
   determining, by the eNodeB, based at least in part upon the policy information, the service information, and the service requested by the user equipment, whether to implement the carrier aggregation feature to provide the service to the user equipment;
   when the eNodeB determines that the carrier aggregation feature is to be implemented, requesting, by the carrier aggregation service aware scheduler of the eNodeB, the user equipment to reconfigure the radio resource control connection to add a secondary component carrier corresponding to the secondary serving cell; and
   allocating, by the carrier aggregation service aware scheduler of the eNodeB, physical media resources for the service from both the primary serving cell and the secondary serving cell.

9. The method of claim 8, wherein the policy information comprises a rule that specifies a condition under which the user equipment should utilize the carrier aggregation feature on a service-specific basis.

10. The method of claim 8, wherein the service information specifies a plurality of services available to the user equipment.

11. The method of claim 8, further comprising, when the eNodeB determines that the carrier aggregation feature is not to be implemented, maintaining the radio resource control connection.

12. The method of claim 8, wherein allocating physical media resources for the service from both the primary serving cell and the secondary serving cell is based upon a bandwidth requirement of the service.

13. The method of claim 12, wherein allocating physical media resources for the service from both the primary serving cell and the secondary serving cell is further based upon radio link control buffer status.

14. The method of claim 8, wherein requesting, by the carrier aggregation service aware scheduler of the eNodeB, the user equipment to reconfigure the radio resource control connection comprises requesting, by the carrier aggregation service aware scheduler of the eNodeB, the user equipment to reconfigure the radio resource control connection to add a further secondary serving cell.

15. A computer-readable storage medium comprising computer-executable instructions that, when executed by a processor of an eNodeB, which provides a primary serving cell and a secondary serving cell, cause the eNodeB to perform operations comprising:

establishing, with a user equipment, a radio resource control connection via a primary component carrier corresponding to the primary serving cell;

generating and sending a capability inquiry to the user equipment;

in response to the capability inquiry, receiving, by a primary serving cell agent, from the user equipment, capability information indicating that the user equipment is capable of implementing a carrier aggregation feature;

receiving, by a carrier aggregation service aware scheduler, policy information from the primary serving cell agent;

receiving, by the carrier aggregation service aware scheduler, service information from the primary serving cell agent;

learning, by the carrier aggregation service aware scheduler, a service requested by the user equipment;

determining, based at least in part, upon the policy information, the service information, and the service requested by the user equipment, whether to implement the carrier aggregation feature to provide the service to the user equipment;

when the eNodeB determines that the carrier aggregation feature is to be implemented, requesting, by the carrier aggregation service aware scheduler, the user equipment to reconfigure the radio resource control connection to add a secondary component carrier corresponding to the secondary serving cell; and allocating, by the carrier aggregation service aware scheduler, physical media resources for the service from both the primary serving cell and the secondary serving cell.

16. The computer-readable storage medium of claim 15, wherein the policy information comprises a rule that specifies a condition under which the user equipment should utilize the carrier aggregation feature on a service-specific basis.

17. The computer-readable storage medium of claim 15, wherein the service information specifies a plurality of services available to the user equipment.

18. The computer-readable storage medium of claim 15, wherein the operations further comprise, when the eNodeB determines that the carrier aggregation feature is not to be implemented, maintaining the radio resource control connection.

19. The computer-readable storage medium of claim 15, wherein allocating physical media resources for the service from both the primary serving cell and the secondary serving cell is based upon a bandwidth requirement of the service.

20. The computer-readable storage medium of claim 19, wherein allocating physical media resources for the service from both the primary serving cell and the secondary serving cell is further based upon radio link control buffer status.

* * * * *